No. 626,056. Patented May 30, 1899.
V. CUMBERSON.
MECHANICAL INSTRUMENT FOR TYPE WRITERS.
(Application filed Dec. 17, 1898.)
(No Model.)

Witnesses
Edward C. Howard
M. F. Keating

Inventor
Victor Cumberson
By his Attorney
Charles J. Kintner

THE NORRIS PETERS CO., PHOTO-LITHO., WASHINGTON, D. C.

UNITED STATES PATENT OFFICE.

VICTOR CUMBERSON, OF NEW YORK, N. Y.

MECHANICAL INSTRUMENT FOR TYPE-WRITERS.

SPECIFICATION forming part of Letters Patent No. 626,056, dated May 30, 1899.

Application filed December 17, 1898. Serial No. 699,619. (No model.)

*To all whom it may concern:*

Be it known that I, VICTOR CUMBERSON, a citizen of the United States, residing in the city of New York, borough of Brooklyn, county of Kings, and State of New York, have made a new and useful Invention in Implements for Use in Connection with Type-Writing Machines, of which the following is a specification.

My invention comprises a scale so divided and numbered as to be applicable in connection with type-writing machines; and its object is to so gage or measure type-written work, particularly in connection with the copying of statements, headings, &c., as to enable the operator to locate the individual lines of the type-written matter at points equidistant from opposite sides of the page, or, in other words, to have it so written upon the page as to appear in perfectly uniform relation. This object is effected by applying a scale to the work to be copied in such manner that the number indicated on the scale will give a correct indication of the point at which the pointer or indicator of the type-writing machine itself must be located with relation to the scale carried by the carriage thereof.

My invention and its application or use will be fully understood by referring to the accompanying drawings, in which—

Figure 1:
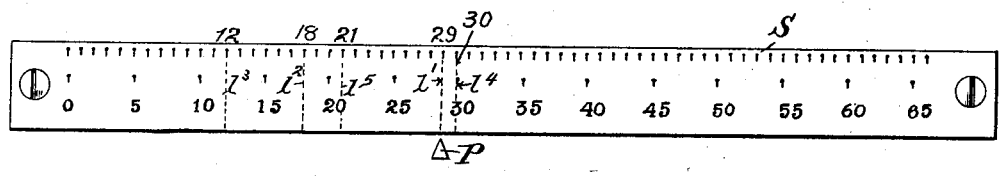
Figure 2:
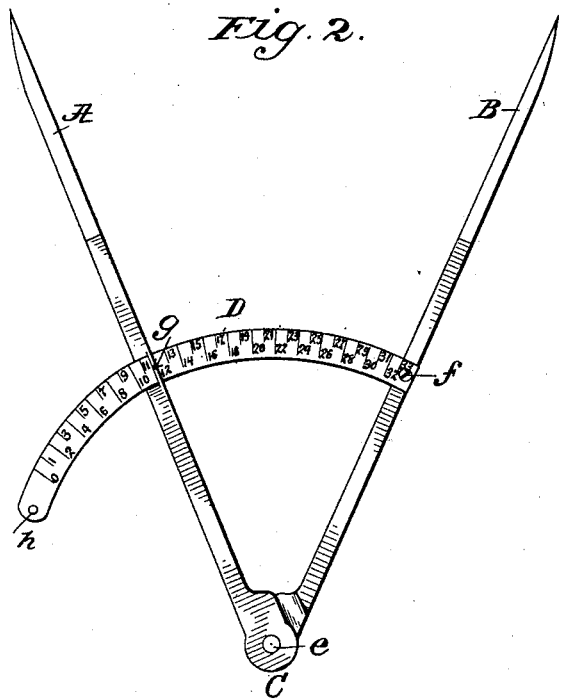

Figure 1 illustrates the scale of an ordinary Remington type-writing machine divided into sixty-six (66) spaces, the stationary pointer or indicator of the machine being located beneath said scale; and Fig. 2 is a side elevational view of a preferred form of my invention as applicable in connection with the aforesaid scale and for the purpose hereinbefore indicated.

It is often necessary in the copying of type-written matter—as, for instance, in the making up of bank statements and in the copying of statements and headings in general—to so locate the individual lines thereof as to give a perfectly uniform effect to the entire page of type-written matter, in which event the operator of a type-writing machine necessarily finds it difficult to thus arrange the matter of the individual lines, and my invention is designed to overcome this difficulty. I accomplish this by devising a scale which bears a fixed relation to the scale carried by the type-writer carriage and by using this scale in such manner as to give at once to the operator an indication of the point on the scale carried by the type-writer carriage to which said carriage must be moved in order to start the particular word or line to be copied and centralized.

Referring to the drawings in detail for a full and clear understanding of my invention, such as will enable others skilled in the art to make and use the same, and first to Fig. 1, S represents the scale carried by the carriage of an ordinary Remington type-writing machine divided, as shown, into sixty-six (66) spaces. P represents the stationary pointer or indicator, located beneath said scale and over which the latter moves as the carriage is moved from left to right, and vice versa.

The preferred form of my invention is illustrated in Fig. 2, wherein A and B represent the legs of a pair of dividers, pivoted at C in the usual manner by a pivot-pin $e$. D represents a curvilinear scale having one of its ends secured by a screw $f$ about the central or middle part of the leg B, the free end of said scale passing through a combined guideway and index $g$ near the inner face of the leg A, and $h$ is a pin secured in the other end of the scale for limiting the movements of the individual legs A and B of the dividers. This scale B is divided, as indicated, into thirty-three (33) equal divisions, or, in other words, just one-half of the scale S, carried by the type-writer carriage. It will be apparent, therefore, that the scale D and dividers A and B have a fixed relation to the divisions upon the scale S, so that said dividers and scale D may be used for the purpose of centralizing the subject-matter to be copied.

In using the invention it is only necessary to measure with the dividers the length of the word or line it is desired to copy and centralize, and when this is done the number immediately under the index $g$ gives a correct indication of that number on the scale S, which must stand or be located directly over the stationary pointer or indicator P before writing the word or line to be centralized.

To give an illustration of the operation of my invention, suppose it is required to centralize and type-write the following matter upon a page: "Statement: Earnings and Operating Expenses Great Northern and Western Railroad Company for the Year Ending Dec. 30, 1898." The operator takes the dividers in the left hand and brings the points thereof at the end of the legs A and B to bear at the opposite ends of the word "Statement." In doing this the index $g$ will appear directly over the number "29." The carriage of the type-writing machine is then moved in such manner as to bring the stationary pointer or indicator P below the number "29," as indicated by the dotted line $1^1$, Fig. 1, and the operator proceeds with the writing of the word. The operator now applies the dividers in the same manner to the words "Earnings and Operating Expenses," and the index $g$ will appear directly over the number "18." Consequently the type-writer carriage is moved until the pointer or indicator P is located directly below the number "18," as indicated by the dotted line $1^2$ in Fig. 1, and the operator proceeds with the writing of these words. The dividers are now applied in the same manner to the words "Great Northern and Western Railroad Company," and the index $g$ will appear directly over the number "12." Consequently the type-writer carriage is moved until the pointer or indicator P is located directly below the number "12," as indicated by the dotted line $1^3$ in Fig. 1, and the operator proceeds with the writing of these words. The dividers are now applied to the words "for the," and the index $g$ will appear directly over the number "30" on the scale. Consequently the type-writer carriage is moved until the pointer or indicator P is located directly below the number "30," as indicated by the dotted line in Fig. 1, and the operator proceeds with the writing of these words. The dividers are now applied to the words "Year Ending Dec. 30, 1898," and the index $g$ will appear directly over the number "21." Consequently the type-writer carriage is moved until the pointer or indicator P is located directly below the number "21," as indicated by the dotted line $1^4$ in Fig. 1, and the operator proceeds with the writing of these words. The statement as thus centralized and type-written will appear on the page in the following manner:

STATEMENT.
Earnings and Operating Expenses
GREAT NORTHERN AND WESTERN
RAILROAD COMPANY
for the
Year Ending Dec. 30, 1898.

It is found that with this device an operator can very speedily tabulate statements or reports and give to the type-written matter the same orderly arrangement on successive numbers of copies which will be substantially the duplicates of each other in every instance.

Having thus described my invention, what I claim, and desire to secure by Letters Patent of the United States, is—

1. As an article of manufacture an implement for use in connection with type-writing machines, consisting of a pair of dividers having a curvilinear scale D secured at one end to one leg of the dividers and passing through a guideway in the other leg of said dividers, said scale being graduated to one-half the number of divisions on the scale of the type-writing machine with which it is to be used, substantially as described.

2. As an article of manufacture an implement for use in connection with type-writing machines, consisting of a pair of dividers having a curvilinear scale D detachably secured to one leg of the dividers by a screw $f$, said scale being graduated to one-half the number of divisions on the scale of the type-writing machine with which it is to be used, substantially as described.

VICTOR CUMBERSON.

Witnesses:
 LYDIA K. VENTH,
 TENNIE KUNZ.